(12) United States Patent
Thulin

(10) Patent No.: US 8,469,237 B2
(45) Date of Patent: Jun. 25, 2013

(54) DISPENSING DEVICE FOR DOSAGE OF POWDERED MATERIAL

(76) Inventor: Claes Thulin, Stockholm (SE)

( * ) Notice: Subject to any disclaimer, the term of this patent is extended or adjusted under 35 U.S.C. 154(b) by 0 days.

(21) Appl. No.: 13/468,168

(22) Filed: May 10, 2012

(65) Prior Publication Data

US 2012/0292348 A1 Nov. 22, 2012

(30) Foreign Application Priority Data

May 18, 2011 (SE) .................................... 1150452-9

(51) Int. Cl.
*G01F 11/10* (2006.01)

(52) U.S. Cl.
USPC ........ 222/361; 222/181.1; 222/243; 222/336; 222/449

(58) Field of Classification Search
USPC .............. 222/181.1, 197, 199–200, 243–244, 222/336, 359, 361, 340–341, 448–449, 559
See application file for complete search history.

(56) References Cited

U.S. PATENT DOCUMENTS

| | | | | | |
|---|---|---|---|---|---|
| 922,315 | A | * | 5/1909 | McLellan | 222/336 |
| 1,455,970 | A | * | 5/1923 | Resek | 222/153.03 |
| 1,471,621 | A | * | 10/1923 | McCord | 222/243 |
| 1,904,756 | A | * | 4/1933 | Wooster | 222/336 |
| 2,240,030 | A | * | 4/1941 | Bobrick et al. | 222/231 |
| 2,983,408 | A | * | 5/1961 | Schwartz | 222/284 |
| 3,164,302 | A | * | 1/1965 | Indjian | 4/227.1 |
| 3,193,159 | A | * | 7/1965 | Swindler | 222/336 |
| 4,113,150 | A | | 9/1978 | Ostergaard | |
| 4,516,701 | A | * | 5/1985 | Tribble | 222/361 |
| 4,964,546 | A | * | 10/1990 | Morrow et al. | 222/352 |
| 5,421,491 | A | * | 6/1995 | Tuvim et al. | 222/336 |
| 5,685,461 | A | * | 11/1997 | Mitchell | 222/184 |
| 6,016,936 | A | * | 1/2000 | Fan | 222/181.1 |
| 6,450,371 | B1 | * | 9/2002 | Sherman et al. | 222/361 |
| 6,749,091 | B2 | * | 6/2004 | Connelly et al. | 222/361 |
| 7,178,697 | B2 | * | 2/2007 | Brundick et al. | 222/181.1 |

FOREIGN PATENT DOCUMENTS

JP 2001-275843 A 10/2001

* cited by examiner

*Primary Examiner* — Frederick C Nicolas
(74) *Attorney, Agent, or Firm* — Dickstein Shapiro LLP

(57) ABSTRACT

A dispensing device for dosage of powdered material comprises a closed housing containing the powdered material and provided with a laterally displaced outlet for the dosed powdered material. An external manually operated sledge is arranged between the housing and the outlet. The sledge has a through-going pocket for containing the desired dose of the powdered material. When operating the sledge, the through-going pocket is moved from a position in the housing to a position in the outlet so as to effect dispensing of the dose of the powdered material through the action of gravity. The sledge also has an agitator including two posts and a bracket that extends between the posts for agitating the powdered material within the housing. The bracket is slightly arched and the leading edge inclines obliquely downwardly so as to press the powdered material towards the pocket when operating the sledge.

10 Claims, 1 Drawing Sheet

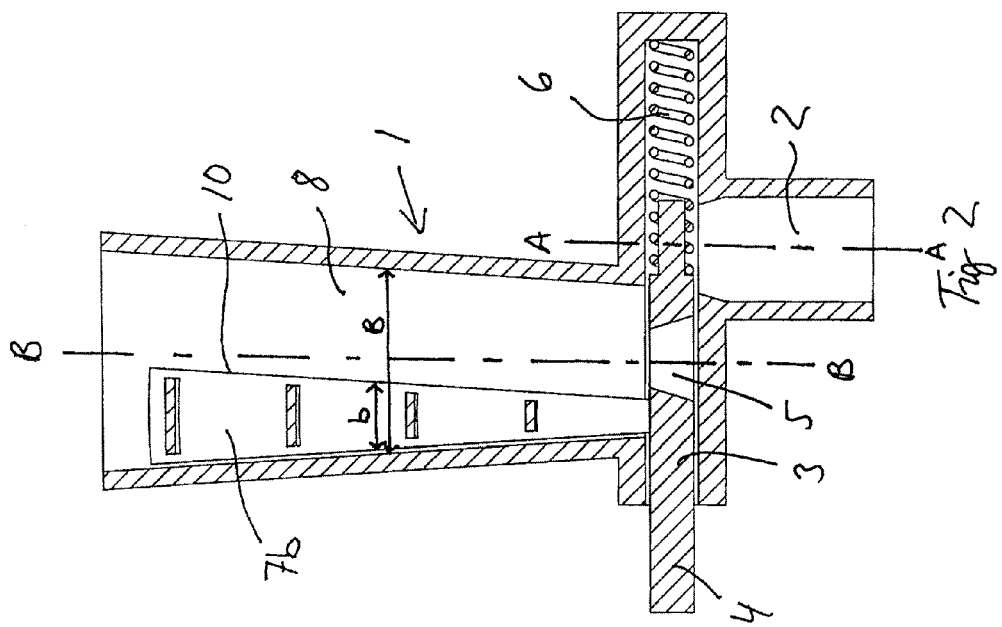
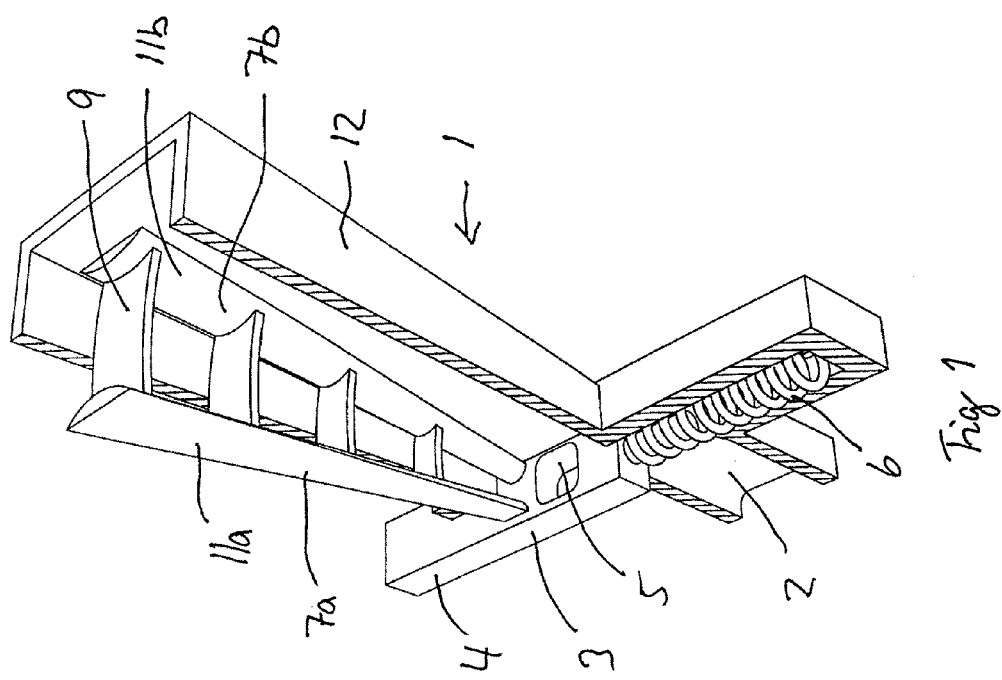

DISPENSING DEVICE FOR DOSAGE OF POWDERED MATERIAL

FIELD OF THE INVENTION

The invention relates to a dispensing devise for dosage of powdered material comprising a closed housing containing the powdered material and provided with a laterally displaced outlet for the dosed powdered material, and an externally manually operated sledge arranged between the housing and the outlet, the sledge being provided with a through-going pocket for containing the desired dose of the powdered material, and when operating the sledge the through-going pocket is adapted to be moved from a position in the housing to a position in the outlet so as to effect dispensing of the dose of the powdered material through the action of gravity, the sledge being provided with means for agitation of the powdered material within the housing when the sledge is moved.

BACKGROUND OF THE INVENTION

When dosage powdered material, the particles of which are small, usually less than 50 μm in diameter and have a tendency to attach to each other, such as talc powder, for instance, it is difficult to obtain several unit doses after each other with known dispensers. Often different amounts are obtained. This is due to that, when dosage of talc powder, for instance, by known dispensers voids are formed in the talc powder since it is non-free flowing, which mean that the talc powder does not fill the means for feeding out the correct amount/dose.

One way of reducing the differences between the doses is to shake or lightly tap on the dispenser between each dosage so as to increase the likelihood that the correct dose is obtained.

The object of the invention is thus to achieve a mechanical dispensing device by which the above-mentioned drawbacks are totally or partially eliminated.

This object is achieved by a dispensing device characterized in that the means for agitation comprises two posts and at least one bracket, which extends between the posts and is slightly arched, and the leading edge of which inclines obliquely downwardly so as to press the powdered material towards the pocket when operating the sledge.

Preferred embodiments are stated in the dependent claims.

BRIEF DESCRIPTION OF THE DRAWINGS

The invention is described in more detail below in the form of a non limiting example, reference being made to the appending drawings, on which FIG. 1 is a partially sectioned perspective view of a dispensing device according to the invention, and FIG. 2 is a sectioned side view of the dispensing device shown in FIG. 1.

DESCRIPTION OF PREFERRED EMBODIMENTS

As can be seen from FIGS. 1 and 2 a dispensing device according to the invention comprises a closed housing 1 having essentially rectangular frustro-conical shape, which housing contains a powdered material and which is provided with a laterally displaced outlet 2 for the dosed powdered material, preferably of non-free flowing type, and a biased sledge 3 manually operable from the outside arranged between the housing and the outlet, and more precisely at the pointed part of the housing. The sledge is provided with on one hand a key 4 protruding outside of the housing and on the other hand a through going pocket 5 for holding the desired dose of the powdered material. This pocket has preferably inverted rectangular frustro-conical shape relative to the housing, i.e. the tip is directed towards the housing. When operating the sledge from a filling position to a output position of the powdered material a spring 6 is adapted to be compressed, and the through-going pocket in the sledge is adapted to be moved from a lower part of the housing to the outlet so as to allow output of the dose of the powdered material through the action of gravity.

To improve and guarantee that the through-going pocket in the sledge is filled with the correct amount of the powdered material the sledge is provided with a means for agitation of the powdered material inside the housing. The means for agitation of the powdered material comprises at least one post, preferably two posts 7a, 7b, adapted to run close along one side 8 of the housing, of which one is shown in the drawing, when operating the key. In the case of two posts they are adapted to run along two opposite sides of the housing.

For enabling a displacement/agitation of the powdered material downwardly towards the pocket 5, when moving the sledge/operating the key, at least one, in the embodiment shown four, bracket(s) 9 is (are) adapted to protrude from the post, and in the case of two posts to extend between said posts 7a, 7b.

The bracket 9 is preferably slightly arched and its leading edge, as seen in the direction of movement of the sledge, is inclined obliquely downwardly so as to press/facilitate displacement of the powdered material towards the pocket 5 when operating the sledge 3.

The housing 1 has preferably frustro-conical shape with a rectangular cross-section and the posts 7a, 7b have sides directed towards the short sides 12 of the rectangular with complementary shape to said short sides, so that in the end positions of the sledge the short sides 10 of the posts abut along the short sides of the rectangular, as seen in FIG. 2.

The posts 7a, 7b for agitation of the powdered material can have a width (b) which amounts to about 10 to 50%, preferably about 30% of the internal width (B) of the long sides of the rectangular of the housing 1.

From FIG. 1 it is seen that the surface 11a of the posts 7a, 7b, which is directed towards the long sides 8 of the rectangular, has a flat surface, while the surface 11b directed towards the powdered material is preferably arched.

The outlet 2 is laterally displaced relative to the housing 1 to such an extent that the centre axes A of the outlet 2 is laterally displaced relative to the centre axis B of the housing 1 that the centre axis A is placed a small distance outside the short side 12 of the housing. See FIG. 2.

The dispensing device according to the invention is preferably prefilled and of disposable type. Furthermore, the housing may be contained in case (not shown) of a suitable design.

Examples of the powdered materials that may be dosed by the dispensing device according to the invention are, but not limited to, talc powder, different salts of acids, powder of minerals etc.

The invention claimed is:

1. A dispensing device for dispensing a dose of powdered material comprising a closed housing containing the powdered material and provided with a laterally displaced outlet for the dose of the powdered material, and an external manually operated sledge arranged between the housing and the outlet, the sledge being provided with a through-going pocket for containing the dose of the powdered material, and when operating the sledge the through-going pocket is adapted to be moved from a position in the housing to a position in the outlet so as to bring about dispensing of the dose of the powdered material through an action of gravity, the sledge being provided with means for agitation of the powdered material within the housing when the sledge is moved, wherein the means for agitation comprises two posts and at least one bracket, which extends between the posts and which is slightly arched, and having a leading edge which inclines obliquely downwardly so as to press the powdered material towards the pocket when operating the sledge.

2. The dispensing device according to claim 1, wherein the posts are adapted to run close along the sides of the housing when operating the sledge.

3. The dispensing device according to claim 1, wherein the posts has a width (b) of about 10% to 50% of an internal width (B) of the housing.

4. The dispensing device according to claim 3, wherein the width (b) of the post is about 30% of an internal width (B) of the housing.

5. The dispensing device according to claim 1, wherein the housing has frustro-conical shape with rectangular cross-section, wherein the sledge is arranged at a pointed part of the housing and adapted to, when operating the sledge, be displaced along a long side of the rectangular cross-section, and wherein the means for agitation of the powdered material have short sides directed towards the short sides of the rectangular cross-section, which have complementary shape to said short sides.

6. The dispensing device according to claim 1, wherein the sledge is biased to a filling position by a spring.

7. The dispensing device according to claim 1, wherein the through-going pocket in the sledge has frustro-conical shape with a point directed towards the powdered material.

8. The dispensing device according to claim 1, wherein the apparatus is a disposable apparatus.

9. The dispensing device according to claim 1, wherein the powdered material is of non-free flowing type.

10. The dispensing device according to claim 1, wherein the powdered material is selected from the group consisting of talc powder, different salts of acids and powder of minerals.

* * * * *